March 30, 1948.   S. NALICK   2,438,817
SPINNER
Filed Oct. 26, 1945
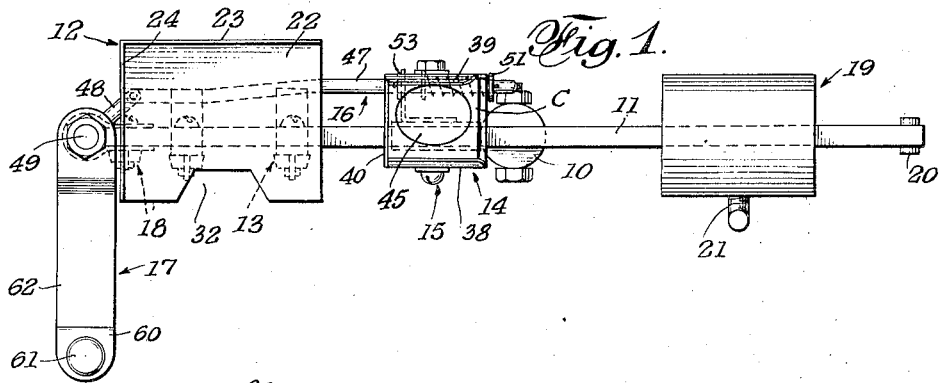
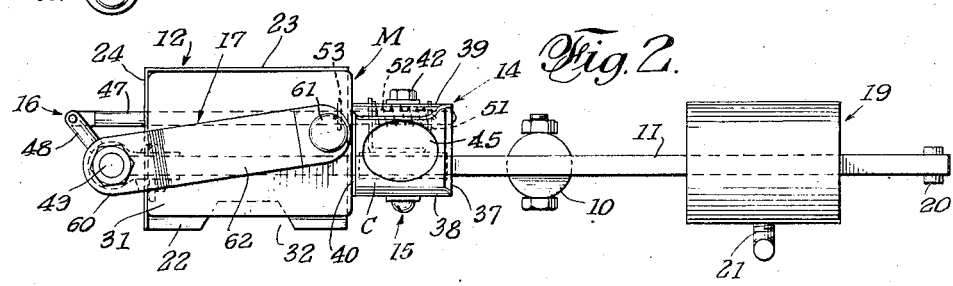
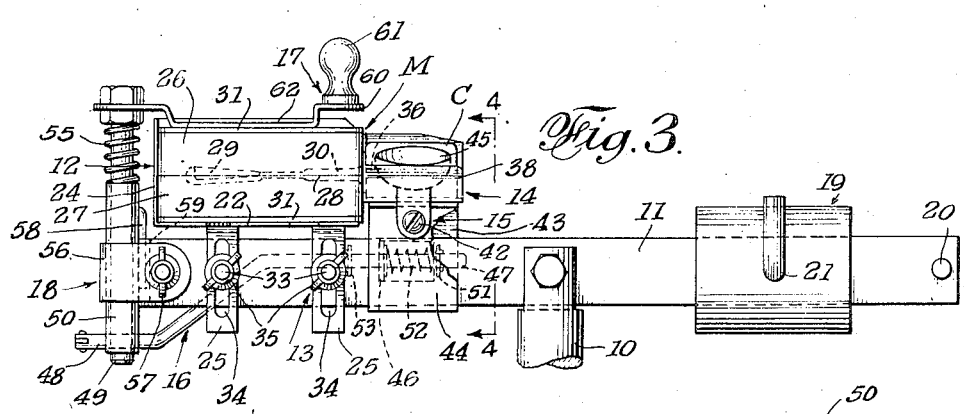
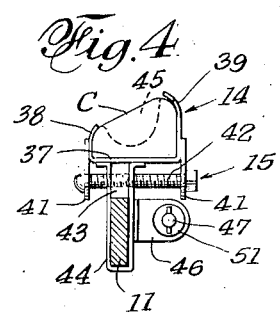
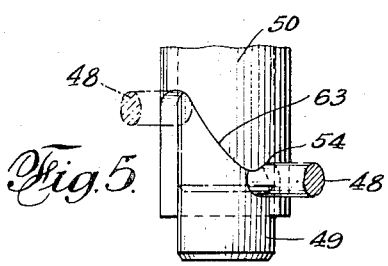
INVENTOR.
STANLEY NALICK
BY
Hyman Jackman
ATTORNEY Patented Mar. 30, 1948

2,438,817

UNITED STATES PATENT OFFICE 2,438,817

SPINNER

Stanley Nalick, Los Angeles, Calif.

Application October 26, 1945, Serial No. 624,711

4 Claims. (Cl. 18—26)

1

This invention relates to spinners such as used for centrifugally injecting molten wax or metal into the cavity of a mold.

A spinner of the type indicated usually comprises an arm mounted at a central point on the shaft of a driver such as an electric motor or the like, whereby said arm may be rotated at a high rate of speed. One end of said arm mounts a mold and a crucible which receives the molten material which is to be injected into the mold. The other end of the arm is suitably counterbalanced. In operation, a quantity of molten material is placed into the crucible and the driver is operated to spin the arm and to cause injection, by centrifugal force, of said material into the cavity of the mold. Because the molds vary in size in all dimensions and the operators are frequently lacking in the necessary skill to establish a suitable operative relationship between the mold and the crucible, the prior spinners have proved faulty and inefficient.

It is an object, therefore, of the present invention to provide a spinner which can be adjusted in accordance with size of the mold and arranged to establish a desired operative relationship between the mold and crucible so that injection operations can be accomplished easily, quickly and efficiently.

Another object of the invention is to provide a novel and improved spinner embodying novel means for moving the crucible thereof into and out of operative association with the mold receiving molten material from said crucible.

More specifically, the invention contemplates a spinner having mold supporting means which can be adjusted in accordance with the thickness of a mold, a crucible support which can be adjusted in accordance with the width of the mold, lever operated means for suitably moving the crucible toward and from the mold, means for adjusting the latter means in accordance with the size of the mold, and pressure means comprising the mentioned lever for holding the mold in position on its support.

My invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes one embodiment of the present invention, which is given by way of illustration or example only.

In the drawings, like reference characters designate similar parts in the several views.

In the drawing,

Fig. 1 is a top plan view of a spinner embodying the present invention, the parts being shown in position to receive a mold.

Fig. 2 is a similar view with the mold in position and the parts moved into operative association.

Fig. 3 is a side elevational view of the spinner as shown in Fig. 2.

Fig. 4 is a cross-sectional view as taken on the line 4—4 of Fig. 3.

Fig. 5 is an enlarged fragmentary detail view of cam means used in the invention.

As herein indicated, the centrifugal casting spinner of the present invention may be employed for injecting molten wax or molten metal into a mold, the spinner being designed, physically, for each specific purpose. The drawing illustrates a spinner which is more particularly adapted as a wax injector. The spinner as herein contemplated may be said to comprise, generally, a rotatable shaft or stud 10 which may be driven by suitable means such as an electric motor; an arm or bar 11 mounted on the stud 10 and extending preferably horizontally on either side of the stud; a mold support 12 carried on one end of the arm or bar 11; means 13 whereby the mold support can be adjusted with respect to the arm; a crucible support 14; means 15 whereby the crucible support can be adjusted with respect to a mold M on the mold support; means 16 for moving a crucible C in the support 14 toward and from the mold M and maintain the crucible and its nozzle in yieldable physical alignment and contact with the sprue of the mold. I have provided a combined actuating mechanism and hold down means 17 comprising a sleeve 50 mounted at and on end of the bar 11 by a band clamp 56 including a bolt passing through said bar 11 and clamp, said bolt having a winged nut 57 thereon, the sleeve 50 having a spline or rib 58 thereon engages a groove in one end of the bar 11 to present the sleeve from turning, yet providing for adjustment of said sleeve upwardly and downwardly relative to said bar 11, to said mold support 12 and to the mold M thereon. The sleeve 50 has a cam portion 63 including a hump, located adjacent the lower end of the sleeve. An oscillatable upright shaft 49 mounted in the sleeve 50. The lower portion of said oscillatable shaft 49 has an arm 48 extending through the shaft 49 and engages the cam portion of the sleeve whereby the shaft 49 is drawn downwardly by said cam portion. The crank 60 is fastened to the upper end of the shaft 49 and is likewise drawn downward by the cam portion and arm 48 to a hold down position physically contacting the top of the mold M. The arm 48 has a free end which is articularly connected to the link 47 which in turn is yieldably connected with the crucible support 14. The crucible support 14 is slidably mounted on the bar 11 whereby it may be moved to and fro on the bar 11 and also relative to the mold M. The compression spring 55 surrounds the shaft 49 and urges the shaft and its arm 48 into constant contact with the cam portion 63. The hump provides a snap in lowermost position for the transverse arm 48. The major portion of the crank 60 is off-set downwardly as shown at 62. The free end of the crank 60 is preferably provided with a knob or handle 61.

It can now be readily understood that the combined mechanism 17 moves or slides the crucible support and its crucible into contact with the mold support and mold while at the same time, i. e. simultaneously, the crank 60 moves arcuately or angularly and is drawn downwardly by the cam portion to a hold down position for the mold. The hold down means is important especially when a divided mold M is used as contemplated by me.

A weight 19 on the other end of the bar 11 is adjustably and slidably mounted thereon for the purpose of counter-balancing the molding means and the combined actuating mechanism and hold down means for the mold, etc.

The arm 11 may be a simple metal bar preferably rectangular in cross section extending substantially equally on either side of the rotatable shaft or stud 10. A stop pin 20 on one end of the arm or bar on which the counter-balance 19 is mounted, is provided to prevent inadvertent propulsion of said counter-balance off the arm or bar. A locking screw 21 is provided for adjustably securing the counter-balance to the arm or bar.

The mold support is shown as comprising a platform 22 having a rear wall 23 and an end wall 24, and brackets 25 extending downward from said platform. A mold M can be placed on the platform 22 and against both the walls 23 and 24 as shown in Fig. 2.

The mold M, typically, comprises rubber mold parts 26 and 27, arranged to separate along a parting line 28, and having a cavity 29 terminating in a sprue 30. In practise a metal sheet 31 is placed over both the top and bottom surface of the rubber mold before being positioned on the support 12. A notch 32 is formed in the platform 22 as finger clearance when positioning the mold on or removing it from the support.

The adjusting means 13 for the mold support 12 comprises studs 33 on the arm 11 engaged in slots 34 in the brackets 25 and wing nuts 35 on the studs arranged for clamping engagement with the brackets. By means of this arrangement, the support 12 can be adjusted elevationally with respect to the arm 11 and in accordance with the thickness of the mold M to bring the sprue 30 into alignment with the crucible discharge orifice or nozzle 36.

The crucible support 14 is shown as comprising a bottom wall 37, front and rear walls 38 and 39, respectively, and an end wall 40 having an enlarged opening therein. The walls 38 and 39 may be inwardly bent to retain the crucible C which is slid endwise into position on its support and against the wall 40 as shown.

The adjusting means 15 for the crucible support 14 preferably comprises down-reaching lugs 41 carried by the support 14, a screw 42 mounted to extend between the lugs and to be rotatable therein, and a nut 43 fixedly carried by a slide 44 engaged over the arm 11. As seen in Fig. 4, by rotating the screw 42, the crucible C can be moved transversely or laterally of the arm 11 to bring the discharge orifice or nozzle 36 of said crucible into alignment with the sprue 30 of the mold M.

The connecting means 16 serve to move the crucible from a remote position with respect to the mold, as seen in Fig. 1, to an operatively associated position, as seen in Fig. 2. In the former position, the mold is freed for removal from its support so that a wax pattern formed therein can be removed by separation of the mold parts 26 and 27. In the latter position, spinning of the arm, will result in the centrifugal displacement of molten wax from the crucible cavity 45, through the orifice 36 and through the sprue 30, into the mold cavity 29.

The connecting means 16 includes a rearwardly extending bracket 46 on the slide 44, attached to the under side of the crucible support a rod 47 extending through a hole in said bracket, an arm 48 on a vertical post or upright oscillatable shaft 49, and a sleeve 50 in which the post or upright oscillatable shaft 49 is movable both endwise and rotationally. The rod 47 carries an abutment washer 51 for one end of a compression spring 52 which has its other end in abutment with the bracket 46. The rod 47 further carries an abutment washer 53 which also has abuting relationship with the bracket 46. The arrangement is such that, starting with the position of Fig. 1 and exerting a pull on the rod 47, the spring 52 is first brought into abutment with the bracket 46 and then bodily moves the slide 44 and, consequently the crucible, into abutment with the mold M. Continued movement of the rod 47 will merely cause compression of the spring 52 to create a reactive force tending to hold the crucible yieldably but tightly against the mold M as seen in Fig. 2.

The mentioned pull on the rod 47 is effected by rotating the post 49 by manipulation of the handle means 17 causing an arcuate movement of the arm 48 and generally straight-line movement of said rod 47. By providing an offset bend in the rod 47, as shown in Fig. 3, said rod can axially rotate during its straight-line movement as it is being moved by the arcuately moving arm 48.

The arm 48 is associated with a cam 63 formed on the lower end of the sleeve 50 so that the mentioned rotational movement of the post 49 from the position of Fig. 1 to the position of Fig. 2 will depress the post 49 as the arm 48 rides down on the cam 63. A retention notch 54 in the cam serves to retain the arm 48 in the depressed position of the post, against inadvertent displacement.

A compression spring 55 around the post 49 and engaged between the top of the sleeve 50 and the actuating arm means 17, is compressed during downward movement of the post and seeks to retain the rotational positions of the arm 48 as shown in Figs. 1 and 2.

The means 18 adjustably positions the sleeve 50 in accordance with the adjusted position of the mold support 12. Said means comprises a clamping clip 56 engaged with the sleeve and carried by means of a bolt and nut 57 on the end of the arm 11. By loosening said bolt and nut, the sleeve 50 can be adjusted, and then locked in place by tightening said bolt and nut. Rotation of the sleeve is obviated as by a key 58 on the sleeve operating in a slot 59 formed in the end of the arm 11.

The arm means 17 comprises an arm or crank 60 having a handle 61 on its end and formed with a depressed intermediate portion 62. The arm or crank 60 is so arranged that it is out of engagement with a mold on its support as shown in Fig. 1 when the crucible C is remote from said mold, and moves into overstanding engagement with the top of the mold, i. e., with the top plate 31 when the mold and crucible are operatively arranged as in Fig. 2. The depressed portion 62 of the crank 60 serves as a hold-down for the mold as best seen in Fig. 3.

In operation, the supports 12 and 14 and the sleeve 50 are adjusted in accordance with the size of the mold M so that the crucible orifice 36 is aligned with the sprue 30 and the arm or crank 60 suitably clamps the mold M on its support 12. The arm or crank 60 is swung outwardly so that a mold can be placed on the support 12. The arm or crank 60 is then swung into position over and pressing upon the mold to actuate the means 16 and bring the crucible C into contiguity with the end of the mold. Because of the locking engagement between the arm 48 and the notch 54, the parts will retain their position. Molten wax is then ladled or otherwise placed in the crucible cavity 45 and the stud 10 rotated at a high rate of speed to spin the arm 11 around the stud as a center, causing centrifugal injection of the wax into the mold cavity 29. When the arm 11 stops spinning, the arm or crank 60 is moved back to its outward position to separate the crucible from the mold and to expose the mold so that it can be removed from its support for separation of its parts 26 and 27 and removal of the wax pattern in the mold cavity 29. The operation is then repeated with assurance that the elements of the spinner will, at all times resume their proper relationship.

It will now be readily understood that I have produced novel combinations in a centrifugal casting spinner:

I. A spinner in which there are combined forces urging the nozzle of the crucible into the sprue of the mold, namely a yieldable pressure by the spring 52 and the centrifugal force acting in the same direction as the spring 52 to aid in maintaining the nozzle in the sprue.

II. Both vertical and lateral adjusting means for the mold support and crucible support respectively wereby the sprue and nozzle may be accurately aligned with each other.

III. A combined actuating and hold down mechanism whereby the crucible and its nozzle are moved to operative position and the hold down crank 60 is brought to position operatively by a single swing of the crank 60 through the medium of the handle or knob 61.

While I have illustrated and described what I now regard as the preferred embodiment of my invention, the construction is, of course, subject to modifications without departing from the spirit and scope of my invention. I, therefore, do not wish to restrict myself to the particular form of construction illustrated and described, but desire to avail myself of all modifications without departing from the spirit and scope of my invention. I, therefore, do not wish to restrict myself to the particular form of construction illustrated and described, but desire to avail myself of all modifications that may fall within the scope of the appended claims.

I claim:

1. A centrifugal casting spinner comprising a horizontal bar balanced transversely of and secured to a rotatable shaft, a mold support, a crucible support and a sleeve mounted on one end portion of said bar, both said mold support and said sleeve having means thereon whereby they may be adjusted upwardly or downwardly relative to said bar and to said crucible support, said crucible support having means thereon whereby it may be adjustable transversely of said bar and said mold support, said crucible being slidably guided on said bar toward the mold support and away from the axis of said rotatable shaft, said sleeve having a cam surface including a hump portion adjacent its lower end, said sleeve having a shaft oscillatably mounted therein, said shaft having a transverse lower arm thereon cooperating with said cam surface and the hump thereof, the upper end of said oscillatable shaft being provided with a combined actuating crank and hold down member adapted to engage a mold when located in said mold support, said crucible support having an apertured ear thereon, a link connected to said lower arm and passing through said apertured ear and a compression spring maintained thereon by a washer and transverse pin extending through the free end portion of said link, said spring yieldably maintaining the crucible when in its support against the mold when it is in its support, both the centrifugal tendency and the spring urge the crucible and mold into intimate contact when the spinner is in operation.

2. A centrifugal casting spinner comprising a horizontally balanced bar arranged transversely of and secured to a rotatable shaft, a mold support having a mold therein, said mold having a sprue a crucible support having a crucible thereon, said crucible having an exit nozzle, said crucible support being slidably mounted on said bar, a sleeve mounted in an upright position at and on the end of said bar, an oscillatable shaft, a combined actuating crank and hold down means for said mold operatively connected with said crucible support, said mold support having means thereon engaging said bar whereby said mold support may be adjusted to various positions upwardly and downwardly with reference to said bar, crucible support and crucible whereby said mold and its sprue may be accurately aligned with the crucible and its exit nozzle, said crucible support having means thereon engaging said bar to adjust the crucible support and the exit nozzle thereof laterally of said bar and the mold to place the exit nozzle of said crucible into alignment with the sprue of said mold, said mold support being on one end of the bar and the crucible support being slidable on said bar between said rotatable shaft and said mold, whereby the centrifugal tendency will urge said crucible nozzle tightly into the sprue of said mold, said sleeve having a cam portion including a hump therein, said oscillatable shaft being mounted in said sleeve and having an arm extending transversely through said oscillatable shaft and engaging said cam portion of said sleeve, said arm having a free end the free end of said arm having a yieldable connection with said crucible support, said combined actuating crank and hold down means for said mold being secured at one of its end portions to the upper end of said oscillatable shaft, a compression spring surrounding said oscillatable shaft and impinging at one of its ends against the upper end of said sleeve and its opposite end impinging against the secured end portion of said crank on said oscillatable shaft, said spring maintaining said arm against said cam portion, said crank being at least, slightly resilient whereby it yieldably bears downwardly on said mold when it is in its hold down position.

3. In a centrifugal casting spinner comprising a horizontal bar mounted in balanced condition upon a rotatable shaft, a mold support having a horizontally divided mold thereon, a crucible support having a crucible therein, a sleeve mounted at and on the end of said bar, an upright oscillatable shaft mounted in said sleeve, a combined actuating means and hold down means fastened on the upper end of said oscillatable shaft, a cam adjacent the lower end of said sleeve, an arm extending through the lower end of said oscillatable shaft and engaging said cam, said arm having a free end, said crucible support being slidably mounted on said horizontal bar, the free end of said arm being yieldably and articulately connected to said crucible support whereby said crucible support and crucible are propelled along said bar into engagement with said mold, said mold and mold support being located on said bar adjacent said sleeve, said slidable crucible support and crucible being located between the mold support and the axis of said rotatable shaft whereby the centrifugal force urges the crucible into intimate contact with said mold thereby aiding the yieldable connection in maintaining intimate physical contact of said crucible and mold.

4. In a centrifugal casting spinner, comprising a horizontal bar mounted on the upper end of a rotatable shaft in a balanceable condition, an actuating mechanism mounted at and on one end of said bar, a mold support on the end portion of said bar adjacent said actuating mechanism, a crucible support slidably mounted on said bar between said mold support and the axis of said rotatable shaft, whereby said crucible support is urged toward said mold support when said spinner is in operation said mold support having means thereon engaging said bar whereby said mold may be adjusted upwardly and downwardly with reference to said bar and said crucible support, said crucible support having means thereon and engaging said bar whereby said crucible support may be adjusted laterally with reference to said bar and said mold support said actuating mechanism constituting a shifting means for said crucible support and a hold down crank for a mold when a mold is on the mold support.

STANLEY NALICK.

REFERENCES CITED

The following references are of record in the file of this patent:

UNITED STATES PATENTS

| Number | Name | Date |
|---|---|---|
| 1,737,001 | Denner | Nov. 26, 1929 |
| 1,778,652 | Wilson | Oct. 14, 1930 |
| 1,922,937 | Eckert | Aug. 15, 1933 |
| 2,011,955 | Touceda | Aug. 20, 1935 |